US006870236B2

(12) United States Patent
Johnson

(10) Patent No.: US 6,870,236 B2
(45) Date of Patent: Mar. 22, 2005

(54) INTEGRATED RESISTOR NETWORK FOR MULTI-FUNCTIONAL USE IN CONSTANT CURRENT OR CONSTANT VOLTAGE OPERATION OF A PRESSURE SENSOR

(75) Inventor: Russell L. Johnson, New Brighton, MN (US)

(73) Assignee: Honeywell International, Inc., Morristown, NJ (US)

( * ) Notice: Subject to any disclaimer, the term of this patent is extended or adjusted under 35 U.S.C. 154(b) by 27 days.

(21) Appl. No.: 10/441,877

(22) Filed: May 20, 2003

(65) Prior Publication Data

US 2004/0245585 A1 Dec. 9, 2004

(51) Int. Cl.[7] .......................... H01L 27/14; H01L 21/00
(52) U.S. Cl. ...................... 257/414; 257/536; 257/773; 438/48
(58) Field of Search ................................ 257/414, 415, 257/536, 734, 773; 438/48, 382

(56) References Cited

U.S. PATENT DOCUMENTS 4,345,477 A    8/1982  Johnson
6,065,346 A    5/2000  Voegele et al.
6,101,883 A    8/2000  Takeuchi
6,329,825 B1  12/2001  Tanaka et al.
6,510,742 B1   1/2003  Johnson
6,718,830 B1 * 4/2004  Johnson ....................... 73/754

FOREIGN PATENT DOCUMENTS

EP              0 239 094 B1    9/1987

* cited by examiner

*Primary Examiner*—Mark V. Prenty
(74) *Attorney, Agent, or Firm*—Schiff Hardin LLP

(57) ABSTRACT

A sensor chip has a piezo-resistive bridge, a temperature resistive bridge, and a multifunctional resistor network that can be used to provide span compensation when operating the piezo-resistive bridge in a constant current mode. In the constant current mode, the multifunctional resistor network can also be used to provide a bias potential to an epitaxial layer of the sensor chip. In a constant voltage mode, the multifunctional resistor network can be used to provide three different gains for a temperature channel that includes the temperature resistive bridge in order to customize the output of the temperature channel for specific operating temperature ranges.

45 Claims, 12 Drawing Sheets

5th Order Polynomials:

[Rin(T)/Rin(25°C)] For Rb//(R30+R32) = -1.124887E-13*T^5 + 9.821594E-11*T^4 -2.971986E-8*T^3 + 6.271443E-6*T^2 + 1.568956E-3*T + 9.572393E-1

[Rin(T)/Rin(25°C)] For P Bridge Only= -3.016520E-14*T^5 + 4.602305E-11*T^4 -2.282578E-8*T^3 + 7.538498E-6*T^2 -2.253132E-5*T + 9.961908E-1

5th Order Polynomials:

TCR For Rb//(R30+R32) = d(Rin)/dT For Rb//(R30+R32) = 5*(-1.124887E-13)*T^4 + 4*(9.621594E-11)*T^3 -(2.971986E-8)*T^2 + 2*(6.271443E-6)*T + (1.568956E-3)

TCR For P Bridge Only = d(Rin)/dT For P Bridge Only = 5*(-3.016520E-14)*T^4 + 4*(4.602305E-11)*T^3 -3*(2.282578E-8)*T^2 + 2*(7.538498E-6)*T -(2.253132E-

INTEGRATED RESISTOR NETWORK FOR MULTI-FUNCTIONAL USE IN CONSTANT CURRENT OR CONSTANT VOLTAGE OPERATION OF A PRESSURE SENSOR

TECHNICAL FIELD OF THE INVENTION

The present invention relates to pressure sensors and, more particularly, to a unique integrated resistor network for multi-functional use in either constant current or constant voltage configurations using the same sensor chip.

BACKGROUND OF THE INVENTION

Piezo-resistive bridge pressure sensors are used in a wide variety of applications including automotive, industrial, medical, and environmental applications. Such sensors typically include a silicon diaphragm incorporating an implanted piezo-resistive Wheatstone bridge. The applied pressure bends the diaphragm and imbalances the bridge, producing a differential, ratiometric output signal that is proportional to the product of the change in resistance caused by the pressure and the bridge excitation voltage.

In high performance pressure sensor applications, the sensor also includes an integrated full Wheatstone bridge for sensing temperature which is typically incorporated off the diaphragm to minimize its sensitivity to pressure. The temperature bridge typically is mechanized using two types of implant resistors, one type with a high temperature coefficient of resistance (TCR) for one set of diagonally opposite legs of the bridge and the other type with a low TCR for the other set of diagonally opposite legs of the bridge. The applied temperature imbalances the bridge, producing a differential, ratiometric output signal that is proportional to temperature and the bridge excitation voltage.

Additional implanted resistors can also be incorporated on-chip to provide bias and feedback gain resistors for connection to an external operational amplifier which then provides a single-ended amplified and signal conditioned output for both temperature and pressure. The temperature output can be used either as a stand alone temperature measurement, or for analog temperature compensation or, more commonly, used in microprocessor-based transducers to accurately calibrate and compensate the pressure sensor output over the full operating ranges of pressure and temperature.

In the pressure bridge configuration, the resistance of diagonally opposed legs varies equally and in the same direction as a function of the mechanical deformation caused by pressure. As the resistance of one set of diagonally opposed legs increases under pressure, the resistance of the other set decreases, and vice versa. Bridge excitation in the form of a voltage or current is applied across two opposite nodes of the bridge. These nodes are usually referred to as excitation inputs or bridge drive inputs. The piezo-resistor bridge differential output at the output nodes of the bridge with full scale pressure applied is equal to the product of the piezo-resistor gauge factor and the bridge excitation voltage, where the gauge factor is defined as the change in resistance due to the strain induced at full scale pressure conditions ($\Delta R$) divided by the resistance (R) at zero pressure input conditions. Assuming that the magnitudes of ($\Delta R$)/R of the bridge element are equal, the differential voltage ($\Delta V$) at full scale pressure is expressed as follows: $(\Delta V)(@FS)=(\Delta R/R) \times V_{bridge}$.

For silicon piezo-resistive sensors, the gauge factor ($\Delta R/R$) at 25° C. may range from 0.03 to as high as 0.12 depending on the limitations of the application such as linearity and overpressure ratings. This range in gauge factor corresponds to full scale output ranges of from 150 mV to 600 mV with 5 volts bridge excitation, which is significantly greater (approximately 100 times) than typical metal strain gauge type sensors. However, the full span output (FSO) of an uncompensated piezo-resistive sensor can exhibit a strong nonlinear dependence on temperature caused be the intrinsic nonlinear dependence of the piezo-resistor gauge factor ($\Delta R/R$) on temperature, whereas the zero pressure (null) offset and null offset dependence on temperature are maintained small in comparison.

The full scale span output is defined as the difference in sensor output corresponding to the maximum and minimum applied pressures. Span shift with temperature is defined as the span as a function of temperature divided by the span at 25° C. Span Shift(T) in percent is equal to $100 \cdot [\text{Span}(T° C.)/\text{Span}(25° C.)]$. The span shift curve is nonlinear with a negative slope with temperature as illustrated in FIG. 4 and is identified in FIG. 4 as K3, where K3 is defined as the ratio of the pressure sensitivity ($\Delta R/R$) of the heavy implant piezo-resistive bridge as a function of temperature normalized to the value at 25° C. In equation form, $K3(T)=[(\Delta R/R(T))]/[(\Delta R/R(25° C.))]$ and may be expressed by the following $5^{th}$ order polynomial:

$$K3(T)=-(6.265753E-14) \cdot T^5+(5.393845E-11) \cdot T^4-(2.440481E-08) \cdot T^3+(8.022881E-06) \cdot T^2-(2.585262E-03) \cdot T+(1.058300)$$

The magnitude of the slope decreases with increasing temperature. A typical value of K3 at 25° C. is $-0.25\%/° C$. Thus, in most applications, the sensor bridge output must be compensated, for the span shift(T) in particular, before it can be used in practice.

FIG. 4 also illustrates the temperature characteristics of the heavy implant resistors (K2) and the light implant resistors (K1). The heavy implant resistors (K2) is defined as follows: K2=Ratio of the resistance of the heavy implant as a function of temperature normalized to the value at 25° C. In equation form, $K2=[Rheavy(T)]/[Rheavy(25° C.)]$ and may be expressed by the following $5^{th}$ order polynomial:

$$K2(T)=-(3.018497E-14) \cdot T^5+(4.603604E-11) \cdot T^4-(2.282857E-08) \cdot T^3+(7.538750E-06) \cdot T^2-(2.252834E-05) \cdot T+(0.9963789)$$

The light implant resistors (K1) is defined as follows: K1=Ratio of the resistance of the light implant as a function of temperature normalized to the value at 25° C. In equation form, $K1(T)=[Rlight(T)]/\{Rlight(25° C.)]$ and may be expressed by the following $5^{th}$ order polynomial:

$$K1(T)=-(8.171496E-14) \cdot T^5+(9.930398E-11) \cdot T^4-(3.557091E-08) \cdot T^3+(9.691127E-06)T^2+(2.958093E-03) \cdot T+0.923953$$

It is noted that the change in resistance of the light implant resistors as a function of temperature K1(T) is much greater than that of the heavy implant resistors K2(T).

In the temperature bridge configuration, the resistance of diagonally opposed legs varies equally and in the same direction as a function of temperature. As the resistance of one set of diagonally opposed legs increases more due to high positive temperature coefficient of resistance (TCR), the resistance of the other set increases less due to a low positive temperature coefficient of resistance (TCR). Bridge excitation in the form of a voltage is applied across two opposite nodes of the bridge. These nodes are usually referred to as excitation inputs or bridge drive inputs.

Therefore, piezo-resistive bridge pressure sensors frequently include signal conditioning and calibration circuits.

For example, a high-gain, low-noise, temperature stable amplifier may be used to scale the output to more usable levels. The signal-conditioning circuit also typically includes span compensation. The total resistance and the piezo-sensitivity (the ratio of the bridge output to excitation voltage of the bridge) of piezo-resistive bridge pressure sensors are temperature dependent. Typically, bridge resistance increases with temperature while piezo-sensitivity decreases.

Moreover, present piezo-resistive pressure sensors provide only a single fixed light implant (high TCR) resistor element in order to set the gain (feedback) of the on-chip temperature bridge output. Accordingly, this resistor provides a specific value for a particular operating temperature range and, therefore, is not optimum for different or extended operating temperature ranges.

Also, present pressure sensors (designed for constant voltage operation) do not provide an integrated function for unique span compensation of the heavy implant (low TCR) pressure bridge when operated in the constant current mode. Nor do they provide an integrated voltage potential customized to be applied to the chip's epitaxial layer in Silicon-On-Insulator (SOI) applications in order to reduce warm-up drift effects and non-ratiometric errors of the pressure bridge output.

The pressure invention is intended to solve these or other problems.

SUMMARY OF THE INVENTION

According to one aspect of the present invention, a sensor chip having first, second, third, fourth, fifth, sixth, seventh, eighth, ninth, tenth, eleventh, and twelfth terminals, a piezo-resistive bridge, a temperature resistive bridge, first and second resistor networks, and first, second, third, fourth, fifth, sixth, seventh, eighth, ninth, tenth, eleventh, twelfth, and thirteenth conductive paths. The first, second, third, fourth, fifth, sixth, seventh, eighth, ninth, tenth, eleventh, and twelfth terminals permit external connections to the sensor chip. The piezo-resistive bridge is formed on a substrate, and the piezo-resistive bridge includes first and second input nodes and first and second output nodes. The temperature resistive bridge is formed on the substrate, and the temperature resistive bridge includes third and fourth input nodes and third and fourth output nodes. The first resistor network is formed on the substrate, and the first resistor network includes first, second, and third resistors having a common junction. The second resistor network is formed on the substrate, and the second resistor network includes fourth, fifth, and sixth resistors having a common junction. The first conductive path is formed on the substrate and connects the first input node to the first terminal. The second conductive path is formed on the substrate and connects the second input node to the second terminal. The third conductive path includes the third resistor, is formed on the substrate, and connects the first output node to the third terminal of the sensor chip. The fourth conductive path is formed on the substrate and connects the second output node to the fourth terminal of the sensor chip. The fifth conductive path is formed on the substrate and connects the sixth resistor to the fifth terminal of the sensor chip. The sixth conductive path is formed on the substrate and connects the fifth resistor to the sixth terminal of the sensor chip. The seventh conductive path is formed on the substrate and connects the fourth resistor to the seventh terminal of the sensor chip. The eighth conductive path is formed on the substrate and connects the third input node to the twelfth terminal. The ninth conductive path is formed on the substrate and connects the fourth input node to the ninth terminal. The tenth conductive path is formed on the substrate and connects the third output node to the eight terminal of the sensor chip. The eleventh conductive path is formed on the substrate and connects the fourth output node to the fifth terminal of the sensor chip. The twelfth conductive path is formed on the substrate and connects the second resistor to the eleventh terminal of the sensor chip. The thirteenth conductive path is formed on the substrate and connects the first resistor to the tenth terminal of the sensor chip.

According to another aspect of the present invention, a sensor chip having first, second, third, fourth, fifth, sixth, seventh, eighth, ninth, tenth, eleventh, and twelfth terminals, a first resistive bridge, a second resistive bridge, first and second resistor networks, and first, second, third, fourth, fifth, sixth, seventh, eighth, ninth, tenth, eleventh, twelfth, and thirteenth conductive paths. The first, second, third, fourth, fifth, sixth, seventh, eighth, ninth, tenth, eleventh, and twelfth terminals permit external connections to the sensor chip. The first resistive bridge is formed on a substrate, and the first resistive bridge includes first and second input nodes and first and second output nodes. The second resistive bridge is formed on the substrate, and the second resistive bridge includes third and fourth input nodes and third and fourth output nodes. The first resistor network is formed on the substrate, and the first resistor network includes first, second, and third resistors having a common junction. The second resistor network is formed on the substrate, and the second resistor network includes fourth, fifth, and sixth resistors having a common junction. The first conductive path is formed on the substrate and connects the first input node to the first terminal. The second conductive path is formed on the substrate and connects the second input node to the second terminal. The third conductive path includes the third resistor, is formed on the substrate, and connects the first output node to the third terminal of the sensor chip. The fourth conductive path is formed on the substrate and connects the second output node to the fourth terminal of the sensor chip. The fifth conductive path is formed on the substrate and connects the sixth resistor to the fifth terminal of the sensor chip. The sixth conductive path is formed on the substrate and connects the fifth resistor to the sixth terminal of the sensor chip. The seventh conductive path is formed on the substrate and connects the fourth resistor to the seventh terminal of the sensor chip. The eighth conductive path is formed on the substrate and connects the third input node to the twelfth terminal. The ninth conductive path is formed on the substrate and connects the fourth input node to the ninth terminal. The tenth conductive path is formed on the substrate and connects the third output node to the eight terminal of the sensor chip. The eleventh conductive path is formed on the substrate and connects the fourth output node to the fifth terminal of the sensor chip. The twelfth conductive path is formed on the substrate and connects the second resistor to the eleventh terminal of the sensor chip. The thirteenth conductive path is formed on the substrate and connects the first resistor to the tenth terminal of the sensor chip.

According to still another aspect of the present invention, a method of fabricating a sensor chip comprises the following: forming a first resistive bridge so that the first resistive bridge has first and second input nodes and first and second output nodes and so that the first resistive bridge has first, second, third, and fourth resistors; forming a second resistive bridge so that the second resistive bridge has third and fourth input nodes and third and fourth output nodes and so that the second resistive bridge has fifth, sixth, seventh, and eighth resistors; forming at least ninth and tenth resistors so that a sum of the resistances of the ninth and tenth resistors as determined for use as span compensation for constant current operation of the first resistive bridge and the sum of the resistances of the ninth and tenth resistors as determined for use as a feedback resistor in a channel including the second resistive bridge for constant voltage operation of the second resistive bridge have the same value; and, forming an eleventh resistor connected at one end to a junction between the ninth and the tenth resistors and connectible at the other end to a layer of the sensor chip.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
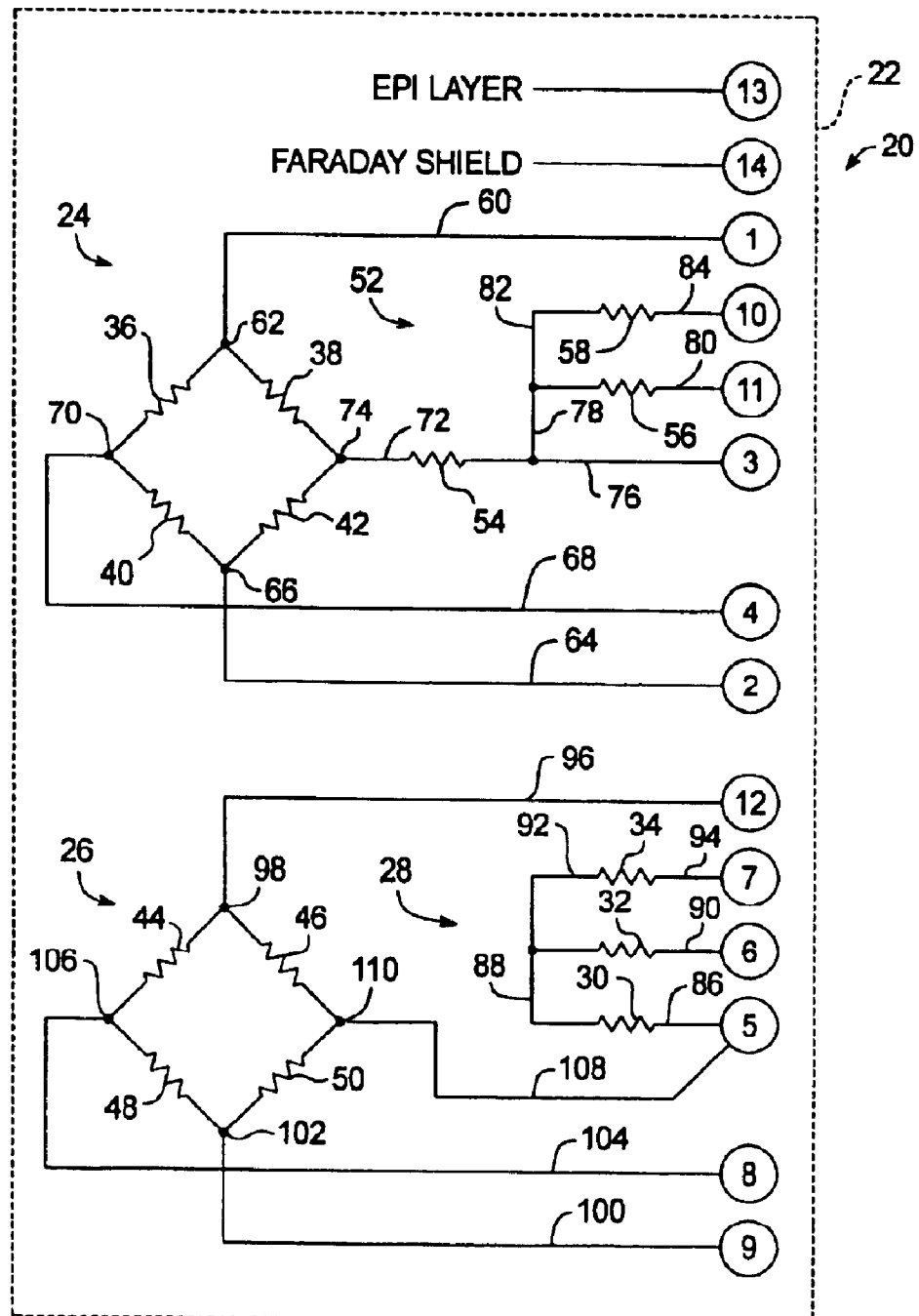
FIG. 1 illustrates a sensor chip according to an embodiment of the present invention.

As shown in FIG. 1, a sensor chip 20 may be fabricated using standard semiconductor processing techniques. The sensor chip 20 includes a substrate 22, which may be a silicon substrate. The substrate 22 is provided with terminals 1–14 that permit external connections to be made at various points in the sensor chip 20. Also, the sensor chip 20 may be provided with an epitaxial layer (such as an n type epitaxial layer) and a Faraday shield layer (both not shown).

The sensor chip 20 includes a pressure piezo-resistive bridge 24, a temperature resistive bridge 26, and a first resistor network 28 formed on the substrate 22. The resistor network 28 comprises one or more resistors such as resistors 30, 32, and 34. The pressure piezo-resistive bridge 24 includes piezo-resistors 36, 38, 40, and 42. The temperature resistive bridge 26 includes resistors 44, 46, 48, and 50. The sensor chip 20 also includes a second resistor network 52 formed on the substrate 22. The second resistor network includes resistors 54, 56, and 58.

Figure 2:
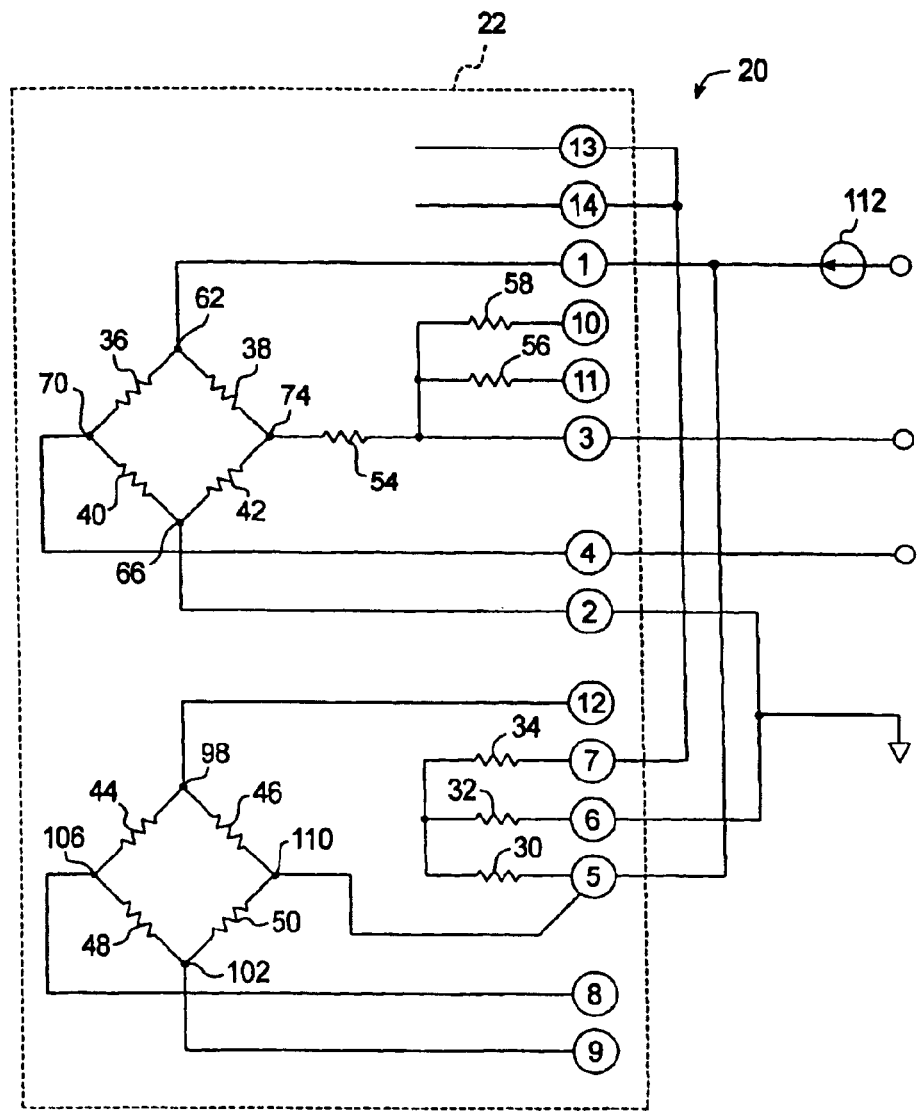
FIG. 2 illustrates the sensor chip of FIG. 1 configured for constant current operation.
Figure 3:
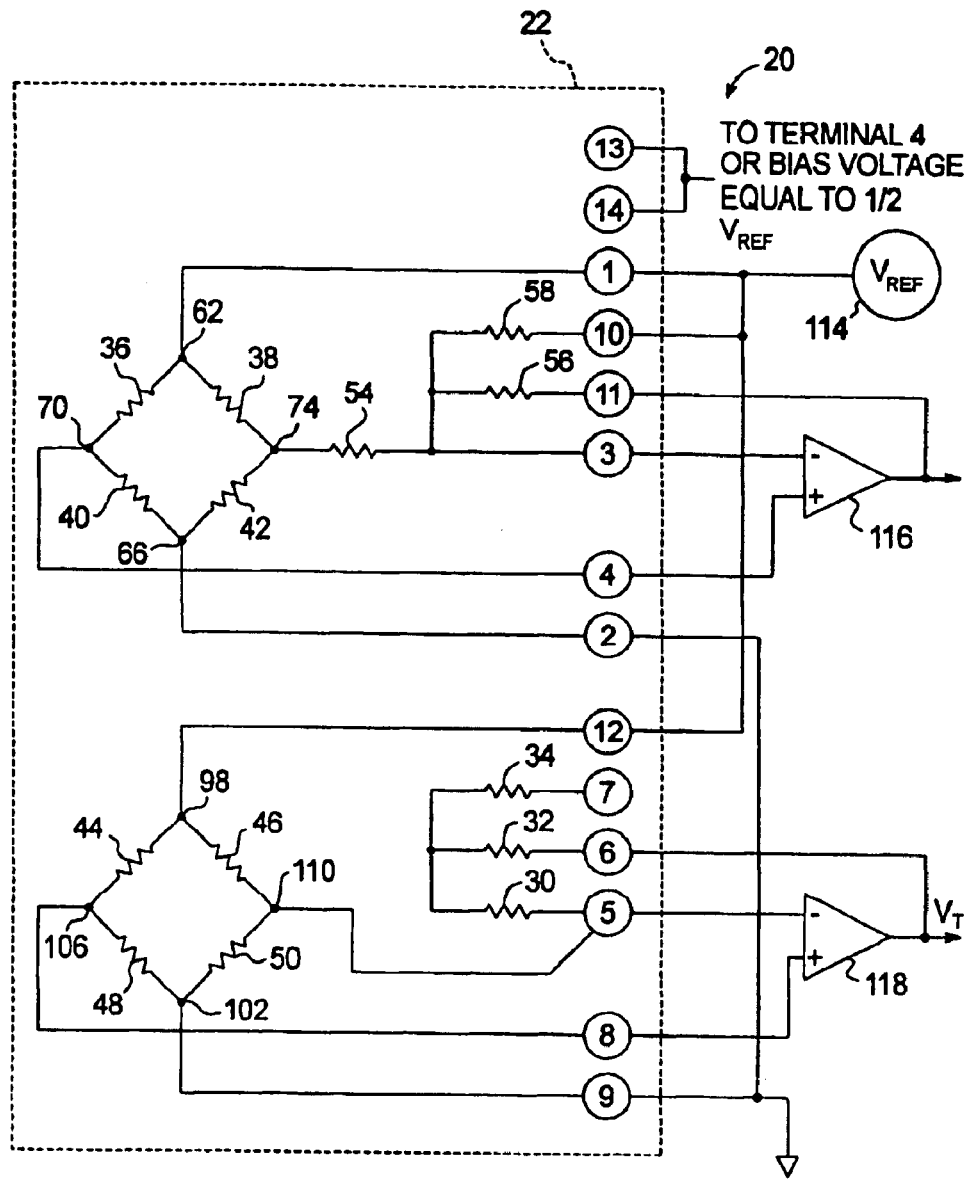
FIG. 3 illustrates the sensor chip of FIG. 1 configured for constant voltage operation.
Figure 4:
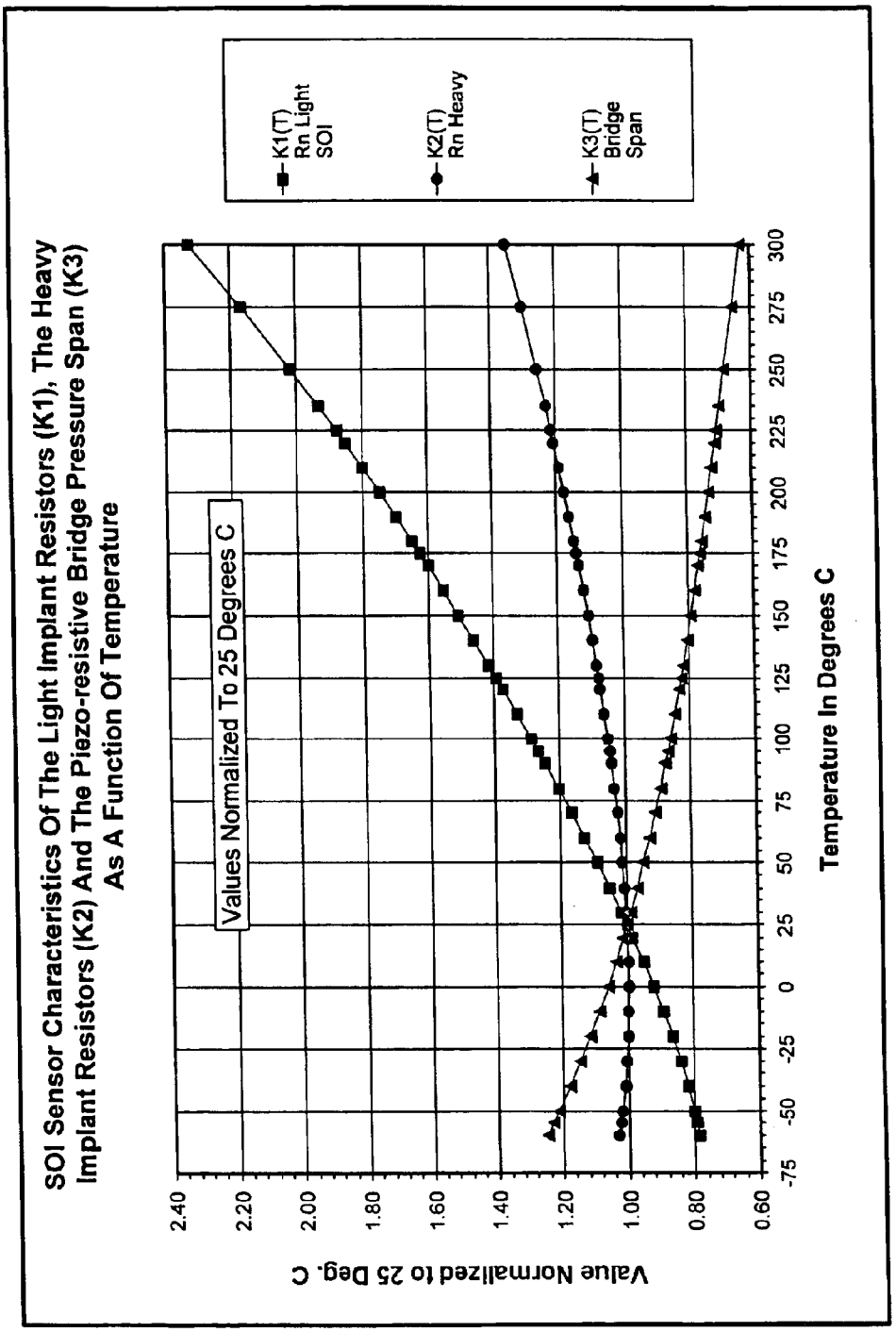
FIG. 4 illustrates the characteristics of the two types of implant resistors and the piezo-resistor span shift as a function of temperature according to the present invention.

Also, various conductive paths are formed on the substrate 22 in order to internally interconnect the elements of the sensor chip 20 in the manner shown in FIG. 1, and the terminals 1–14 are formed on the substrate 22 in order to externally interconnect the elements of the sensor chip 20 in a desired manner such as the manners shown in FIGS. 2 and 3.

A conductive path 60 internally connects the terminal 1 to a first excitation input node 62 formed by a junction of the piezo-resistors 36 and 38. A conductive path 64 internally connects a second excitation input node 66 formed by a junction of the piezo-resistors 40 and 42 to the terminal 2.

A conductive path 68 internally connects a first bridge output node 70 formed by a junction of the piezo-resistors 36 and 40 to the terminal 4. A conductive path 72 internally connects one end of the resistor 54 to a second bridge output node 74 formed by a junction of the piezo-resistors 38 and 42, and a conductive path 76 connects the other end of the resistor 54 to the terminal 3. A conductive path 78 internally connects the other end of the resistor 54 to one end of the resistor 56, and a conductive path 80 connects the other end of the resistor 56 to the terminal 11. A conductive path 82 internally connects the common junction of the resistors 54 and 56 to one end of the resistor 58, and a conductive path 84 internally connects the other end of the resistor 58 to the terminal 10.

A conductive path 86 internally connects one end of the resistor 30 to the terminal 5, and a conductive path 88 internally connects the other end of the resistor 30 to one end of the resistor 32. A conductive path 90 internally connects the other end of the resistor 32 to the terminal 6. A conductive path 92 internally connects the common junction of the resistors 30 and 32 to one end of the resistor 34, and a conductive path 94 internally connects the other end of the resistor 34 to the terminal 7. Thus, the resistors 30, 32, and 34 share a common junction, and this first resistor network 28 provides multi-functional uses with a common sensor design.

A conductive path 96 internally connects the terminal 12 to a first excitation input node 98 formed by a junction of the resistors 44 and 46 of the temperature resistive bridge 26. A conductive path 100 internally connects a second excitation input node 102 formed by a junction of the resistors 48 and 50 to the terminal 9. A conductive path 104 internally connects a first bridge output node 106 to the terminal 8. A conductive path 108 internally connects a second bridge output node 110 to the terminal 5.

The shield layer of the sensor chip 20 is internally connected to the terminal 14 by a suitable conductive path, and the epitaxial layer of the sensor chip 20 is internally connected to the terminal 13 by a suitable conductive path.

By appropriate external connection of the terminals 1–14, the sensor chip 20 of FIG. 1 may be used in either a constant current application or a constant voltage application. FIG. 2 shows the appropriate connections to the terminals 1–14 of the sensor chip 20 of FIG. 1 for constant current application. The terminals 1 and 5 is externally connected to an external constant current source 112 so that a constant current is provided to the first excitation input node 62 of the pressure piezo-resistive bridge 24 and to one end of the resistor 30. The terminals 2 and 6 are externally connected to a reference potential such as ground. The terminals 3 and 4 are the output terminals of the sensor chip 22 and may be externally connected to suitable input terminals of an external high input impedance differential amplifier (not shown).

The terminals 7, 13, and 14 are connected together. The terminals 10, 11, 12, 8, and 9 are left open.

During the formation of the pressure piezo-resistive bridge 24, the temperature resistive bridge 26, the first resistor network 28, and the second resistor network 52, the resistors 30, 32, 34, 46, 48, 56, and 58 are formed as light implant resistors, and the piezo-resistors 36, 38, 40, and 42 and the resistors 44, 50 and 54 are formed as heavy implant resistors. The implanting material, for example, may be Boron. As a result of this implanting, the resistors 30, 32, 34, 46, 48, 56, and 58, the piezo-resistors 36, 38, 40, and 42, and the resistors 44, 50 and 54 each have a predetermined dopant concentration and sheet resistivity.

The ratio of the resistivity of a light implant resistor to the resistivity of a heavy implant resistor, for example, may be on the order of seven. In a first example, a light implant resistor may have a resistivity of 860 ohms per square, and a heavy implant resistor may have a resistivity of 120 ohms per square. Thus, in this first example, each of the resistors 30, 32, 34, 46, 48, 56, and 58 may have a resistivity of 860 ohms per square, and each of the piezo-resistors 36, 38, 40, and 42 and the resistors 44, 50 and 54 may have a resistivity of 120 ohms per square. In a second example, a light implant resistor may have a resistivity of 2064 ohms per square, and a heavy implant resistor may have a resistivity of 288 ohms per square. Thus, in this second example, each of the resistors 30, 32, 34, 46, 48, 56, and 58 may have a resistivity of 2064 ohms per square, and each of the piezo-resistors 36, 38, 40, and 42 and the resistors 44, 50 and 54 may have a resistivity of 288 ohms per square. However, other ratios and resistivities may be used. Moreover, the resistance of the resistor 30 may be selected to be equal to the resistance of the resistor 32.

Moreover, the dopant concentration of the light implant resistor is the same for both resistivities of 860 and 2045 ohms per square. Likewise, the dopant concentration of the heavy implant resistor is the same for both resistivities of 120 and 288 ohms per square. For example, the light implant resistivities may have a dopant concentration in the order of $3 \times 10^{17}$ ions per cubic cm, and the heavy implant resistivities may have a dopant concentration in the order of $1 \times 10^{19}$ ions per cubic cm. Both combinations of light and heavy implant resistivities of the two above examples is achieved using the same wafer mask set and wafer process. The change in the resistivity levels is determined by the parameters of the wafer starting material that control the finished thickness of the resistors.

Figure 5:
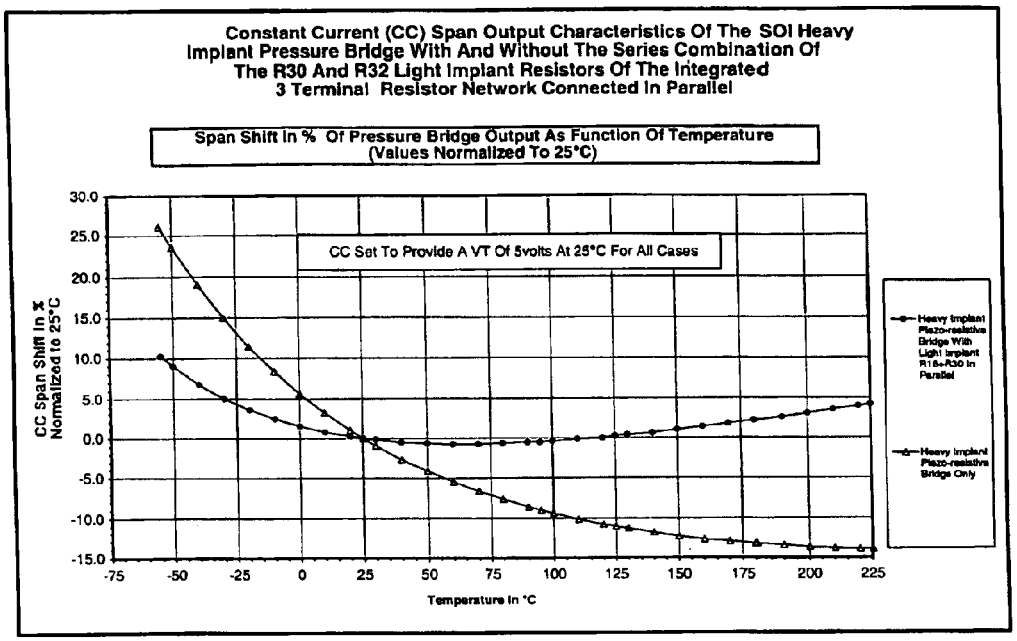
FIG. 5 illustrates and compares the constant current piezo-resistive bridge full scale span output as a function of temperature both with and without utilizing the multi-functional resistor network described below for span compensation with the sensor chip configured for constant current operation as illustrated in FIG. 2.

For the constant current application shown in FIG. 2, the resistors 30 and 32 of the light implant multi-purpose resistor network 28 are connected in series across the first and second excitation input nodes 62 and 66 of the heavy implant piezo-resistive bridge 24. This connection provides span compensation of the piezo-resistive bridge output as a function of temperature as illustrated in FIG. 5 which depicts the span shift of the pressure bridge output (expressed in % change with respect to 25° C.) as a function of temperature both with and without the parallel resistors 30 and 32. Increasing the TCR of the input resistance in turn increases the excitation voltage by the required amount to compensate the span output of the heavy implant pressure piezo-resistive bridge 24 as illustrated in FIG. 5. This input resistance is defined as the equivalent resistance of the series connected resistors 30 and 32 in parallel with the pressure piezo-resistive bridge 24.

Figure 6:
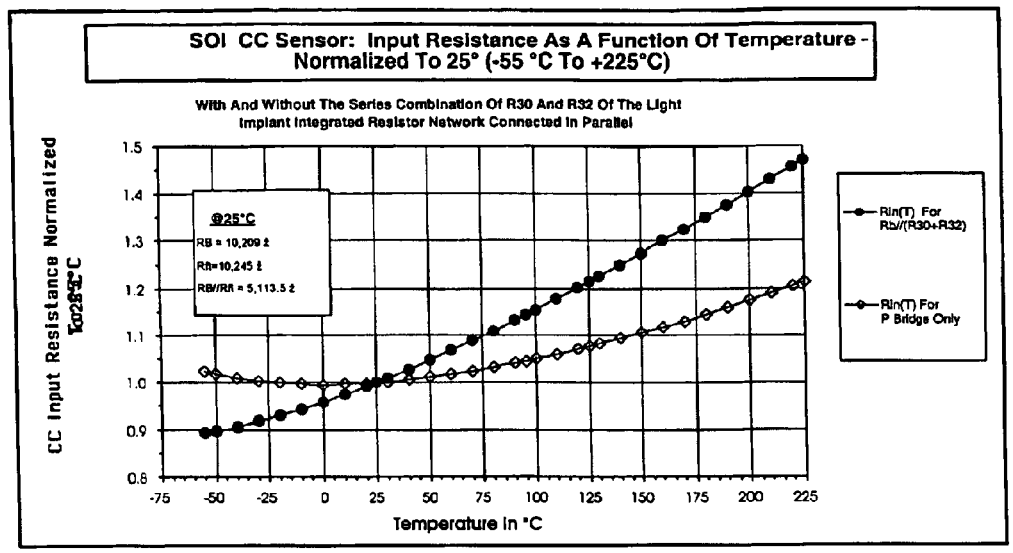
FIG. 6 illustrates and compares the constant current pressure sensor input resistance as a function of temperature both with and without utilizing the multi-functional resistor network described below when configured for constant current operation as illustrated in FIG. 2.

FIG. 6 illustrates the corresponding input resistance as a function of temperature, both with and without the parallel resistors, that is required to accomplish the span compensation of the pressure bridge output as shown in FIG. 5. The TCR of the input resistance may be controlled by the values of the resistors 30 and 32. Decreasing the values of the resistors 30 and 32 increases the TCR of the input resistance which increases the amount of span compensation, and increasing the values of the resistors 30 and 32 decreases the TCR of the input resistance which decreases the amount of span compensation. FIG. 6 illustrates the input resistance as a function of temperature, both with and without the parallel resistors, that is required to accomplish the example of span compensation of the pressure bridge output as shown in FIG. 5.

Figure 7:
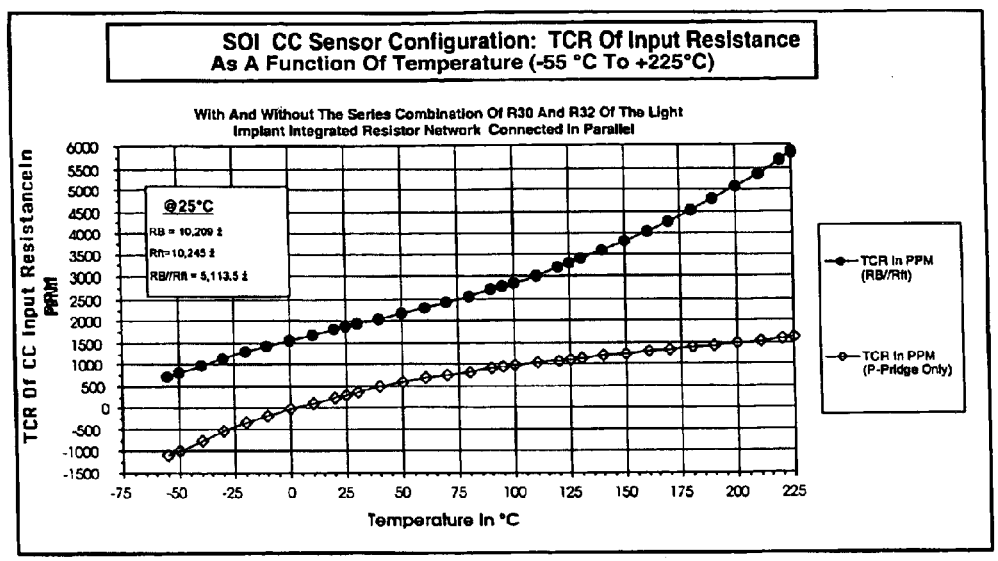
FIG. 7 illustrates and compares the constant current pressure sensor temperature coefficient of resistance (TCR) of the input resistance as a function of temperature both with and without utilizing the multi-functional resistor network described below when configured for constant current operation as illustrated in FIG. 2.

FIG. 7 illustrates the resultant TCR of the input resistance depicted in FIG. 6 as a function of temperature, both with and without the parallel resistors 30 and 32.

The nominal room temperature value of the light implant resistors 30 and 32 may be determined, for example, by that value which provides the desired span compensation. This value is determined by controlling the increase of the input resistance, and therefore the input voltage seen across the terminals 1/5 and 2/6, to offset the decrease in span of the pressure piezo-resistive bridge 24 at a specific desired temperature. For this example, the span compensation was set to reduce the span error from −11.5% to near zero at +125° C. as depicted in FIG. 5.

Figure 8:
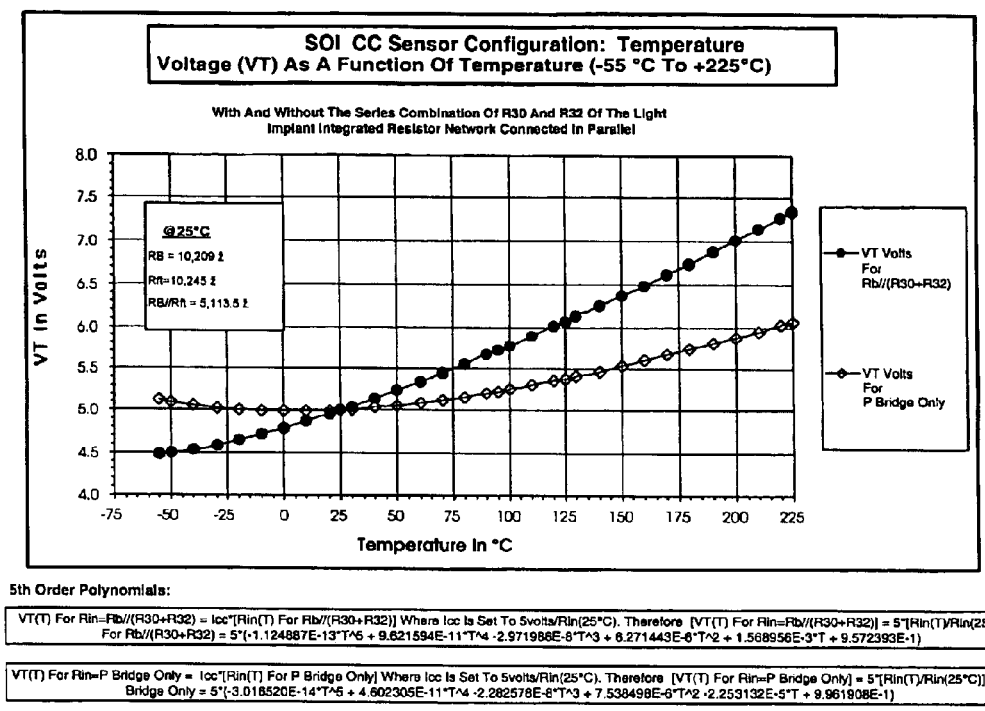
FIG. 8 illustrates and compares the constant current pressure sensor temperature voltage (VT) as a function of temperature both with and without utilizing the multi-functional resistor network described below when configured for constant current operation as illustrated in FIG. 2.

At 125° C. for example, the series combination of light implant resistors 30 and 32 when connected in parallel with the heavy implant piezo-resistive bridge, increased the resistance at 125° C. from +8% to +21% as shown in FIG. 6. This resistance increase, in turn, proportionally increased the excitation voltage across the pressure bridge which provided the desired span compensation as shown in FIG. 8.

In addition, for silicon-on-insulator (SOI) devices, the terminals 7 and 14 are externally connected together so that the resistor 34 is connected to the epitaxial layer. This connection provides a bias potential equal to ½ of the bridge voltage, which reduces warm-up effects and improves the ratiometrics of the pressure piezo-resistive bridge 24.

As suggested above, ion implantation may be used in common with a standard silicon piezo-resistive sensor process to fabricate both the light implant high positive TCR resistors, i.e., the resistors 30, 32, 34, 46, 48, 56, and 58 (typically 2500 ppm/° C. at 25° C.) and the heavy implant low positive TCR resistors, i.e., the piezo-resistor bridge resistors 36, 38, 40, 42, the resistors 46 and 54, and the temperature bridge resistors 44 and 50 (typically 500 ppm/° C. at 25° C.).

The type of implant that is used to fabricate the resistors 30, 32, and 34 is determined by which implant is used to fabricate the piezo-resistors 36, 38, 40, and 42. For example, as described above, the piezo-resistors 36, 38, 40, and 42 are fabricated as heavy implant resistors. Therefore, the resistors 30, 32, and 34 are fabricated as light implant resistors. Alternatively, however, the piezo-resistors 36, 38, 40, and 42 may be fabricated as light implant resistors, in which case the resistors 30, 32, and 34 are fabricated as heavy implant resistors.

The following process sequence assumes at 25° C. conditions and may be used to fabricate the sensor chip 22. First, the final resistance $R_{24}$ of the pressure piezo-resistive bridge 24 across the terminals 1 and 2 is defined according to a desired predetermined specification.

Second, the sum of the resistances of the resistors 30 and 32 is determined as the value, when the resistors 30 and 32 are connected in parallel to the pressure piezo-resistive bridge 24 as shown in FIG. 2 (i.e., the resistors 30 and 32 are connected in series across the terminals 1 and 2), that will achieve a predetermined specified span compensation for constant current operation, where the value of the constant current is set to the desired VT value at 25° C. (5 volts for example) divided by the resistance Rin at 25° C., where Rin is defined as the resistance of the pressure piezo-resistive bridge 24 in parallel with the series combination of the resistors 30 and 32.

This determination may be made in two steps. In the first step, the transfer function VP for the output of the piezo-resistive bridge 24 for constant current excitation with span compensation provided by the resistors 30 and 32 in parallel with the piezo-resistive bridge 24 is derived. For the sensor chip 22 of FIG. 2, this transfer function VP is given by the following equation:

$$VP = VT \left( \frac{1 - \frac{R_{36}R_{42}}{R_{40}R_{38}}}{1 + \frac{R_{36}}{R_{40}} + \frac{R_{36}R_{42}}{R_{40}R_{38}}} \right) \quad (1)$$

where VT is the excitation input for the pressure piezo-resistive bridge 24, $R_{36}$ is the resistance of the piezo-resistor 36, $R_{38}$ is the resistance of the piezo-resistor 38, $R_{40}$ is the resistance of the piezo-resistor 40, and $R_{42}$ is the resistance of the piezo-resistor 42.

In the second step, the performance of the transfer function as a function of temperature for the full scale pressure condition is modeled using appropriate resistances for the pressure piezo-resistive bridge 24 and the resistors 30, 32, and 34 in order to achieve the desired span compensation for the full scale pressure operation of the sensor chip 20 over the appropriate temperature range. The resistance of the pressure piezo-resistive bridge 24, for example, may be 10,209 ohms, and the resistance of each of the resistors 30 and 32, for example, may be 5,217.5 ohms for a sum of 10,435. Therefore, the input resistance, Rin, for this example, is calculated to be 5160.4 ohms (10,209 in parallel with 10,435). The constant current (Icc) required to provide a VT of 5 volts at 25° C., for example, is calculated to be 0.968921 milli-amperes. For the constant current configuration, VT(T) may be used as a temperature signal.

FIG. 8 illustrates VT as a function of temperature over the operation range of −55° C. to +225° C. both with and without the series combination of the light implant integrated resistors 30 and 32 in parallel with the pressure piezo-resistive bridge 24. The average sensitivity from −55° C. to +225° C. of the parallel combination case is +10.272 millivolts/° C. compared to +3.372 millivolts/° C. for the piezo-resistive bridge only case. These sensitivities correspond to a 3× increase in average sensitivity.

Figure 9:
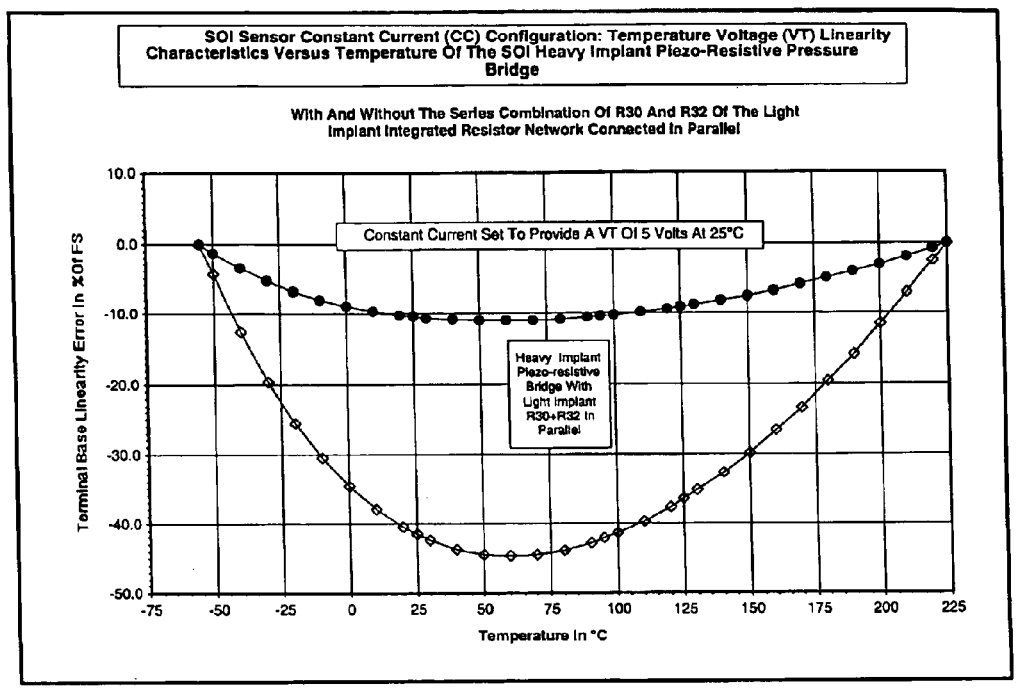
FIG. 9 illustrates and compares the constant current pressure sensor temperature voltage (VT) linearity as a function of temperature both with and without utilizing the multi-functional resistor network described below when configured for constant current operation as illustrated in FIG. 2.

FIG. 9 illustrates the linearity of VT as a function of temperature over the operation range of −55° C. to +225° C. both with and without the series combination of the light implant integrated resistors 30 and 32 in parallel with the pressure piezo-resistive bridge 24. The maximum terminal base linearity (MTBL) error from −55° C. to +225° C. for the parallel combination case is −11.03% compared to −44.70% for the piezo-resistive bridge only case. These average MTBL errors correspond to a 4× decrease in the average MTBL error.

Therefore, the same combination of light implant resistors of the integrated resistor network 28, when connected in parallel with the heavy implant piezo-resistive bridge 24, simultaneously provides span compensation of the piezo-resistive output over temperature and significantly increases the sensitivity and the linearity of the VT temperature voltage.

Third, to achieve multifunctional use, the sum of the resistances of the resistors 30 and 32 as determined for use as span compensation for constant current operation of the pressure piezo-resistive bridge 24, and the sum of the resistances of the resistors 30 and 32 as determined for use as a feedback resistor in the temperature channel for constant voltage operation of the temperature resistive bridge 26 are required to have the same value. In other words, the resistors 30 and 32 should have the same resistances whether they are used for span compensation in a constant current application or as a feedback resistor in the temperature channel in a constant voltage application.

The gain G of the temperature channel, which as will be shown in relation to FIG. 3 includes an external amplifier, is given by the following equation:

$$G = 1 + \frac{R_{30} + R_{22}}{R_{46/50}} \quad (2)$$

where $R_{46/50}$ is the parallel combination of the resistors 46 and 50, $R_{30}$ is the resistance of the resistor 30, and $R_{32}$ is the resistance of the resistor 32.

The gain G may be specified as a function of a set of design criteria. An exemplary set of design criteria for the sensor chip 20 being operated in a constant voltage application may be the following: the nominal output at −55° C. should be approximately 25% of the constant voltage; the nominal output at +225° C. should be approximately 75% of the constant voltage; and, the output should remain within 0% to 100% for worst case ±10% tolerances of the heavy and light implant resistors. Given these exemplary specifications, a nominal gain of 1.952 meets these specifications. Based on the gain specification, and based on the exemplary resistances for the resistors 30 and 32 as set out above, $R_{in}$, is then calculated according to the following equation:

$$R_{46/50} = \frac{R_{30} + R_{32}}{G - 1} = \frac{10435}{1.952 - 1} = 10.961 \text{ ohms} \quad (3)$$

For this exemplary design, the resistances of the temperature bridge resistors 44, 46, 48, and 50 are 23,561 ohms, 20,494 ohms, 20,494 ohms, and 23,561 ohms, respectively. These resistances for the temperature bridge resistors 44, 46, 48, and 50 are required to bring the temperature resistive bridge 26 into balance at approximately 75° C. which sets the amplified output to midrange. The resistances for each of the resistors 36, 38, 40, and 42 may be 10,207 ohms so that the pressure bridge is electrically balanced at zero pressure, given this example.

The resistance value of the resistor 34 is determined to provide two other optional gain selects (a higher gain and a lower gain). This resistance value of the resistor 34 is 9,368 ohms for the exemplary design specifications given above.

As discussed above, by appropriate external connection of the terminals 1–14, the sensor chip 20 also may be used in a constant voltage application. FIG. 3 shows an example of a constant voltage application. The terminal 1 is externally connected to a constant voltage source 114 so that an external constant voltage is provided as a reference voltage to the first excitation input node 62 of the pressure piezo-resistive bridge 24. The terminal 2 is externally connected to a reference potential such as ground. The terminals 3 and 4 are the output terminals of the pressure channel of the sensor chip 20 and are externally connected to respective negative and positive input terminals of an external amplifier 116.

The terminals 1 and 10 are externally connected together to provide a bias voltage to the negative input of the external amplifier 116, and the terminal 11 is externally connected to the output of the external amplifier 116 to provide a feedback resistance for the external amplifier 116.

The terminal 12 is externally connected to the constant voltage source 114 so that an external constant voltage is provided as a reference voltage to the first excitation input node 98 of the temperature resistive bridge 26. The terminal 9 is externally connected to a reference potential such as ground. The terminals 5 and 8 are the output terminals of the temperature channel of the sensor chip 20 and are externally connected to respective negative and positive input terminals of an external amplifier 118. The terminal 6 is externally connected to the output of the external amplifier 118 to provide a feedback resistance for the external amplifier 118.

The piezo-resistors 36, 38, 40, 42, 44, 50 and 54 again are heavy implant resistors, and the resistors 30, 32, 34, 46, 48, 56 and 58 are again light implant resistors.

For constant voltage operation, the resistor network 28 provides three gain options for the output of the temperature resistive bridge 26 that are customized for a specific temperature operating range. These gain options can be selected by use of the terminals 6 and 7 depending on the operating range of the temperature resistive bridge 26. For example, different combinations of the terminals 6 and 7 can be connected to the external amplifier 118 in order to control the gain of the external amplifier 118.

Figure 10:
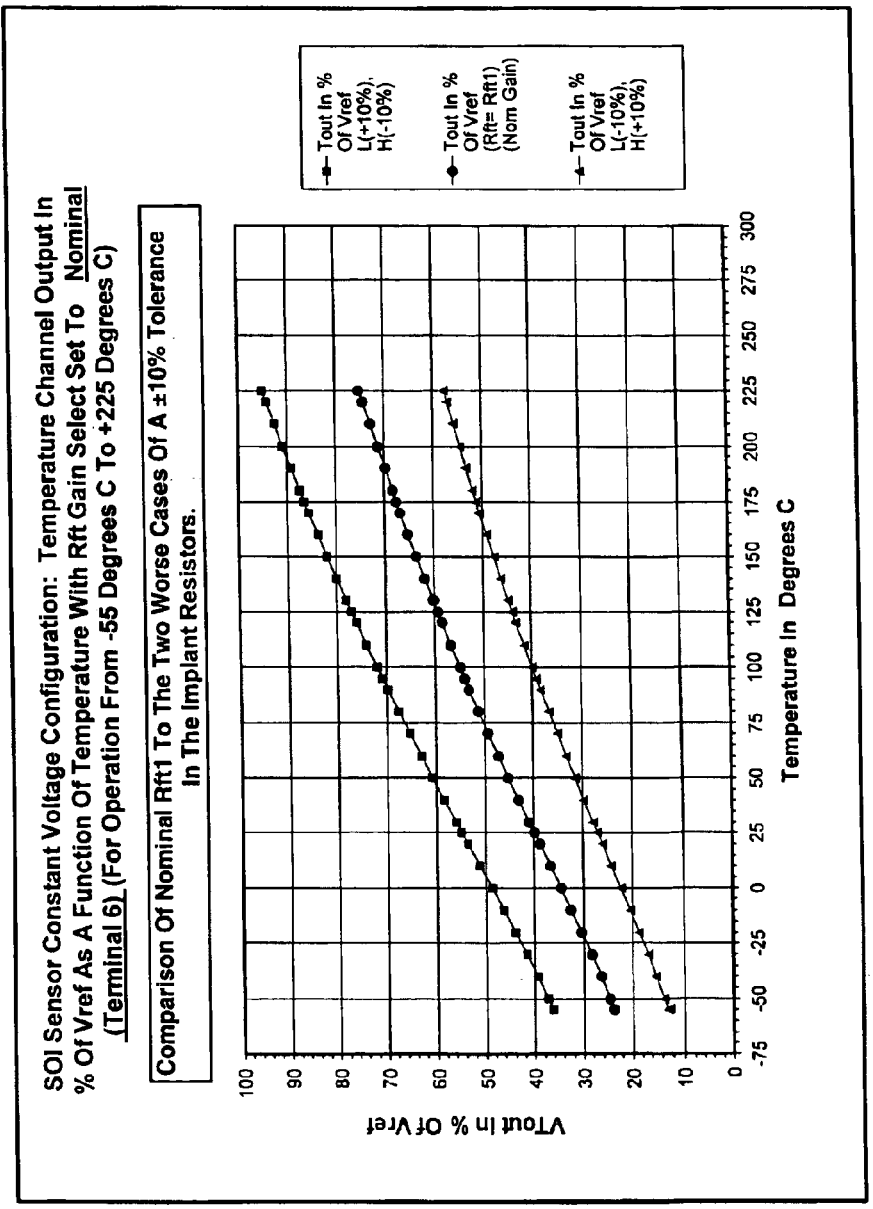
FIG. 10 illustrates and compares the constant voltage operation of the temperature channel output over the temperature range of −55° C. to 225° C. utilizing the multi-functional 3-terminal resistor network described below as a nominal feedback gain resistor with the sensor chip configured for constant voltage operation as illustrated in FIG. 3.

FIG. 10, for example, illustrates the temperature channel output in % of Vref over the temperature range of −55° C. to +225° C. for the nominal gain option where terminal 6 is connected to the output of the external amplifier 118 and terminal 5 is connected to the negative input of the external amplifier 118 as shown in FIG. 3.

Figure 11:
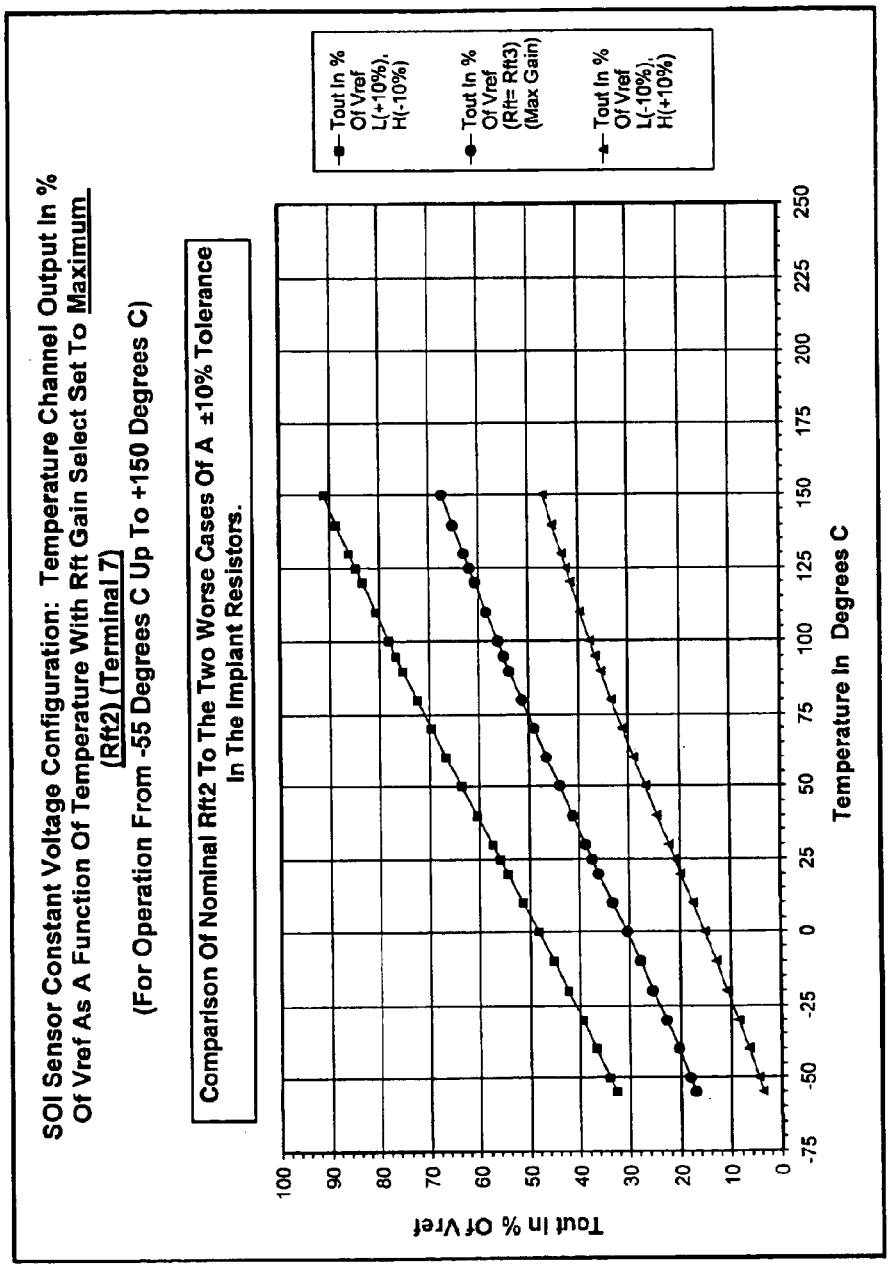
FIG. 11 illustrates and compares the constant voltage operation of the temperature channel output over the temperature range of −55° C. to 150° C. utilizing the multi-functional 3-terminal resistor network described below as a maximum feedback gain resistor with the sensor chip configured for constant voltage operation as illustrated in FIG. 3; and, FIG. 12 illustrates and compares the constant voltage operation of the temperature channel output over the temperature range of −55° C. to 300° C. utilizing the multi-functional 3-terminal resistor network described below as a minimum feedback gain resistor with the sensor chip configured for constant voltage operation as illustrated in FIG. 3.

FIG. 11, for example, illustrates the temperature channel output in % of Vref over the temperature range of −55° C. to +150° C. for the maximum gain option where terminal 7 is connected to the output of the external amplifier 118 and terminal 5 is connected to the negative input of the external amplifier 118 as shown in FIG. 3.

Figure 12:
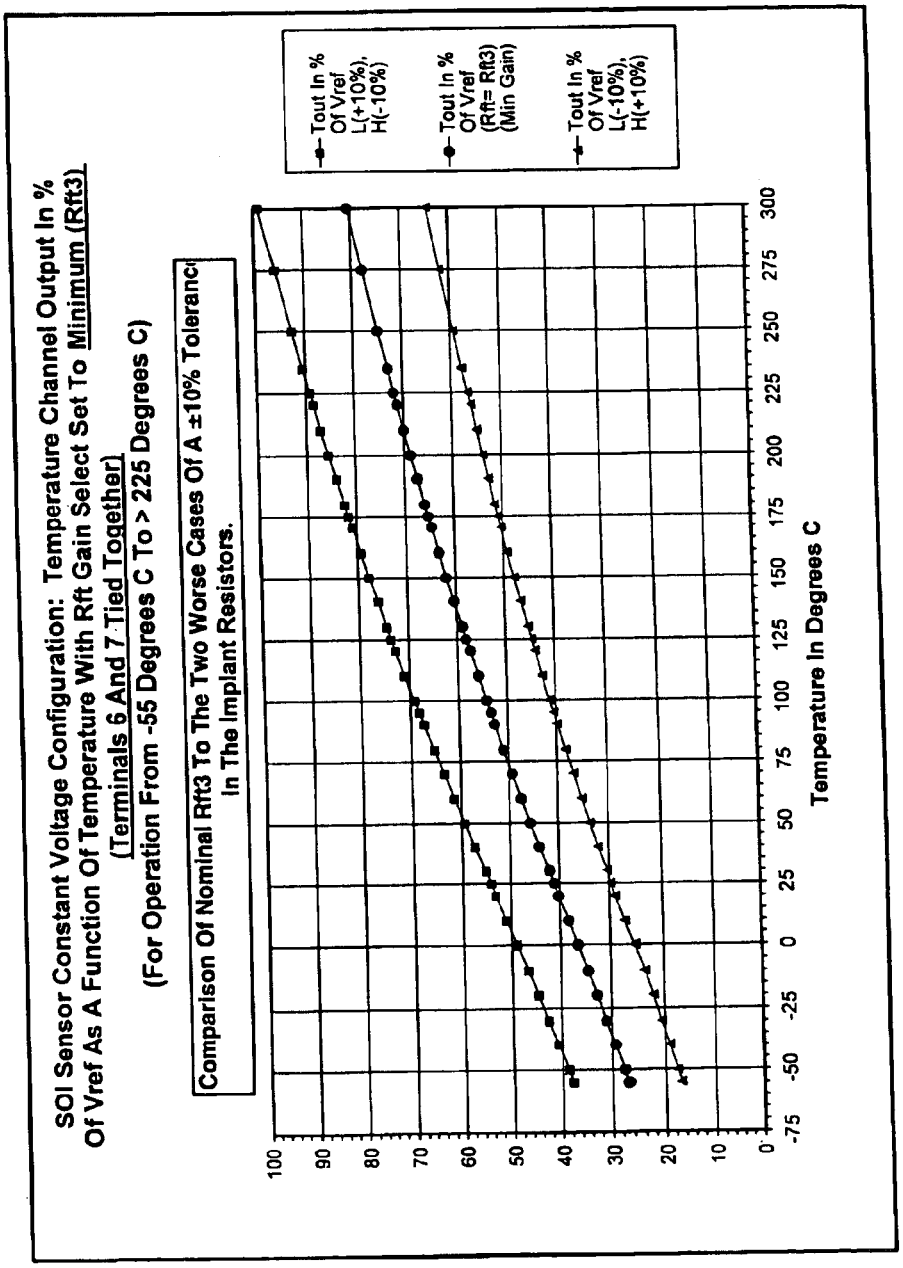

FIG. 12, for example, illustrates the temperature channel output in % of Vref over the temperature range of −55° C. to +300° C. for the minimum gain option where terminals 6 and 7 are connected to the output of the external amplifier 118 and terminal 5 is connected to the negative input of the external amplifier 118 as shown in FIG. 3.

Certain variations of the present invention have been described above. Other variations of the invention will occur to those skilled in the art. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A sensor chip having first, second, third, fourth, fifth, sixth, seventh, eighth, ninth, tenth, eleventh, and twelfth terminals that permit external connections to the sensor chip, the sensor chip comprising:

a piezo-resistive bridge formed on a substrate, wherein the piezo-resistive bridge includes first and second input nodes and first and second output nodes;

a temperature resistive bridge formed on the substrate, wherein the temperature resistive bridge includes third and fourth input nodes and third and fourth output nodes;

a first resistor network formed on the substrate, wherein the first resistor network includes first, second, and third resistors having a common junction;

a second resistor network formed on the substrate, wherein the second resistor network includes fourth, fifth, and sixth resistors having a common junction;

a first conductive path formed on the substrate connecting the first input node to the first terminal;

a second conductive path formed on the substrate connecting the second input node to the second terminal;

a third conductive path including the third resistor formed on the substrate connecting the first output node to the third terminal of the sensor chip;

a fourth conductive path formed on the substrate connecting the second output node to the fourth terminal of the sensor chip;

a fifth conductive path formed on the substrate connecting the sixth resistor to the fifth terminal of the sensor chip;

a sixth conductive path formed on the substrate connecting the fifth resistor to the sixth terminal of the sensor chip;

a seventh conductive path formed on the substrate connecting the fourth resistor to the seventh terminal of the sensor chip;

an eighth conductive path formed on the substrate connecting the third input node to the twelfth terminal;

a ninth conductive path formed on the substrate connecting the fourth input node to the ninth terminal;

a tenth conductive path formed on the substrate connecting the third output node to the eight terminal of the sensor chip;

an eleventh conductive path formed on the substrate connecting the fourth output node to the fifth terminal of the sensor chip;

a twelfth conductive path formed on the substrate connecting the second resistor to the eleventh terminal of the sensor chip; and, a thirteenth conductive path formed on the substrate connecting the first resistor to the tenth terminal of the sensor chip.

2. The sensor chip of claim 1 wherein the first and fifth terminals are connected together, and wherein the second and sixth terminals are connected together.

3. The sensor chip of claim 2 wherein the first terminal is connected to a constant current source, and the second terminal is connected to a reference potential.

4. The sensor chip of claim 1 wherein the piezo-resistive bridge comprises heavy implant resistors, and wherein the fourth, fifth, and sixth resistors comprise corresponding light implant resistors.

5. The sensor chip of claim 4 wherein the heavy implant resistors have a first resistivity, wherein the light implant resistors have a second resistivity, and wherein a ratio of the second resistivity to the first resistivity is on the order of seven.

6. The sensor chip of claim 4 wherein the first and fifth terminals are connected together, and wherein the second and sixth terminals are connected together.

7. The sensor chip of claim 6 wherein the first terminal is connected to a constant current source.

8. The sensor chip of claim 4 wherein the seventh terminal is connected to an epitaxial layer of the sensor chip.

9. The sensor chip of claim 8 wherein the first terminal is connected to a constant current source.

10. The sensor chip of claim 8 wherein the piezo-resistive bridge comprises heavy implant resistors, and wherein the fourth, fifth, and sixth resistors comprise corresponding light implant resistors.

11. The sensor chip of claim 10 wherein the heavy implant resistors have a first resistivity, wherein the light implant resistors have a second resistivity, wherein a ratio of the second resistivity to the first resistivity is on the order of seven.

12. The sensor chip of claim 10 wherein the first and fifth terminals are connected together, and wherein the second and sixth terminals are connected together.

13. The sensor chip of claim 10 wherein the first terminal is connected to a constant current source.

14. The sensor chip of claim 1 wherein the first, tenth, and twelfth terminals are connected together, wherein the second and ninth terminals are connected together, wherein the third and fourth terminals are connected to corresponding inputs of a first amplifier, wherein the fifth and eighth terminals are connected to corresponding inputs of a second amplifier, wherein the eleventh terminal is connected to an output of the first amplifier, and wherein at least one of the sixth and seventh terminals is connected to an output of the second amplifier.

15. The sensor chip of claim 14 wherein the first terminal is connected to a constant voltage source.

16. The sensor chip of claim 15 wherein the piezo-resistive bridge, part of the temperature resistive bridge, and the third resistor comprise heavy implant resistors, and wherein the remainder of the temperature resistive bridge, and the first, second, fourth, fifth, and sixth resistors comprise corresponding light implant resistors.

17. The sensor chip of claim 16 wherein the heavy implant resistors have a first resistivity, wherein the light implant resistors have a second resistivity, and wherein a ratio of the second resistivity to the first resistivity is on the order of seven.

18. The sensor chip of claim 16 wherein the first terminal is connected to a constant voltage source.

19. The sensor chip of claim 14 wherein the sixth terminal is connected to an output of the second amplifier and the seventh terminal is an open circuit.

20. The sensor chip of claim 14 wherein the seventh terminal is connected to an output of the second amplifier and the sixth terminal is an open circuit.

21. The sensor chip of claim 14 wherein the sixth and seventh terminals are connected to an output of the second amplifier.

22. A sensor chip having first, second, third, fourth, fifth, sixth, seventh, eighth, ninth, tenth, eleventh, and twelfth terminals that permit external connections to the sensor chip, the sensor chip comprising:

a first bridge formed on a substrate, wherein the first bridge includes first and second input nodes and first and second output nodes;

a second bridge formed on the substrate, wherein the second bridge includes third and fourth input nodes and third and fourth output nodes;

a first resistor network formed on the substrate, wherein the first resistor network includes first, second, and third resistors having a common junction;

a second resistor network formed on the substrate, wherein the second resistor network includes fourth, fifth, and sixth resistors having a common junction;

a first conductive path formed on the substrate connecting the first input node to the first terminal;

a second conductive path formed on the substrate connecting the second input node to the second terminal;

a third conductive path including the third resistor formed on the substrate connecting the first output node to the third terminal of the sensor chip;

a fourth conductive path formed on the substrate connecting the second output node to the fourth terminal of the sensor chip;

a fifth conductive path formed on the substrate connecting the sixth resistor to the fifth terminal of the sensor chip;

a sixth conductive path formed on the substrate connecting the fifth resistor to the sixth terminal of the sensor chip;

a seventh conductive path formed on the substrate connecting the fourth resistor to the seventh terminal of the sensor chip;

an eighth conductive path formed on the substrate connecting the third input node to the twelfth terminal;

a ninth conductive path formed on the substrate connecting the fourth input node to the ninth terminal;

a tenth conductive path formed on the substrate connecting the third output node to the eight terminal of the sensor chip;

an eleventh conductive path formed on the substrate connecting the fourth output node to the fifth terminal of the sensor chip;

a twelfth conductive path formed on the substrate connecting the second resistor to the eleventh terminal of the sensor chip; and, a thirteenth path formed on the substrate connecting the first resistor to the tenth terminal of the sensor chip.

23. The sensor chip of claim 22 wherein the first and fifth terminals are connected together, and wherein the second and sixth terminals are connected together.

24. The sensor chip of claim 23 wherein the first terminal is connected to a constant current source, and the second terminal is connected to a reference potential.

25. The sensor chip of claim 22 wherein the first bridge comprises heavy implant resistors, and wherein the fourth, fifth, and sixth resistors comprise corresponding light implant resistors.

26. The sensor chip of claim 25 wherein the heavy implant resistors have a first resistivity, wherein the light implant resistors have a second resistivity, and wherein a ratio of the second resistivity to the first resistivity is on the order of seven.

27. The sensor chip of claim 25 wherein the first and fifth terminals are connected together, and wherein the second and sixth terminals are connected together.

28. The sensor chip of claim 27 wherein the first terminal is connected to a constant current source.

29. The sensor chip of claim 25 wherein the seventh terminal is connected to an epitaxial layer of the sensor chip.

30. The sensor chip of claim 29 wherein the first terminal is connected to a constant current source.

31. The sensor chip of claim 29 wherein the first bridge comprises heavy implant resistors, and wherein the fourth, fifth, and sixth resistors comprise corresponding light implant resistors.

32. The sensor chip of claim 31 wherein the heavy implant resistors have a first resistivity, wherein the light implant resistors have a second resistivity, wherein a ratio of the second resistivity to the first resistivity is on the order of seven.

33. The sensor chip of claim 31 wherein the first and fifth terminals are connected together, and wherein the second and sixth terminals are connected together.

34. The sensor chip of claim 31 wherein the first terminal is connected to a constant current source.

35. The sensor chip of claim 22 wherein the first, tenth, and twelfth terminals are connected together, wherein the second and ninth terminals are connected together, wherein the third and fourth terminals are connected to corresponding inputs of a first amplifier, wherein the fifth and eighth terminals are connected to corresponding inputs of a second amplifier, wherein the eleventh terminal is connected to an output of the first amplifier, and wherein at least one of the sixth and seventh terminals is connected to an output of the second amplifier.

36. The sensor chip of claim 35 wherein the first terminal is connected to a constant voltage source.

37. The sensor chip of claim 36 wherein the first bridge, part of the second bridge, and the third resistor comprise heavy implant resistors, and wherein the remainder of the second bridge, and the first, second, third, fourth, and sixth resistors comprise corresponding light implant resistors.

38. The sensor chip of claim 37 wherein the heavy implant resistors have a first resistivity, wherein the light implant resistors have a second resistivity, and wherein a ratio of the second resistivity to the first resistivity is on the order of seven.

39. The sensor chip of claim 37 wherein the first terminal is connected to a constant voltage source.

40. The sensor chip of claim 35 wherein the seventh terminal is an open circuit.

41. The sensor chip of claim 35 wherein the sixth terminal is connected to an output of the second amplifier and the seventh terminal is an open circuit.

42. The sensor chip of claim 35 wherein the seventh terminal is connected to an output of the second amplifier and the sixth terminal is an open circuit.

43. The sensor chip of claim 35 wherein the sixth and seventh terminals are connected to an output of the second amplifier.

44. A method of fabricating a sensor chip comprising:

forming a first resistive bridge so that the first resistive bridge has first and second input nodes and first and second output nodes and so that the first resistive bridge has first, second, third, and fourth resistors;

forming a second resistive bridge so that the second resistive bridge has third and fourth input nodes and third and fourth output nodes and so that the second resistive bridge has fifth, sixth, seventh, and eighth resistors;

forming at least ninth and tenth resistors so that a sum of the resistances of the ninth and tenth resistors as determined for use as span compensation for constant current operation of the first resistive bridge and the sum of the resistances of the ninth and tenth resistors as determined for use as a feedback resistor in a channel including the second resistive bridge for constant voltage operation of the second resistive bridge have the same value; and, forming an eleventh resistor connected at one end to a junction between the ninth and the tenth resistors and connectible at the other end to a layer of the sensor chip.

45. The method of claim 44 further comprising determining a resistance $R_3$ in accordance with the following equation:

$$R_3 = \frac{R_1 + R_2}{G - 1}$$

where $R_1$ is the resistance of the first resistor, where $R_2$ is the resistance of the second resistor, where G is a design criteria, and where $R_3$ is a resistance of a parallel combination of the seventh and eighth resistors.

* * * * *

UNITED STATES PATENT AND TRADEMARK OFFICE
CERTIFICATE OF CORRECTION

PATENT NO.     : 6,870,236 B1
DATED          : March 22, 2005
INVENTOR(S)    : Russell L. Johnson It is certified that error appears in the above-identified patent and that said Letters Patent is hereby corrected as shown below:

Column 2,
Line 51, after "(9.691127E-06)" insert -- • --.

Column 10,
Line 48, change "$R_{30} + R_{22}$" to -- $R_{30} + R_{32}$ --.

Signed and Sealed this

Eleventh Day of October, 2005

JON W. DUDAS
*Director of the United States Patent and Trademark Office*